United States Patent
Liu et al.

(10) Patent No.: US 9,843,218 B2
(45) Date of Patent: Dec. 12, 2017

(54) WIRELESS CHARGING SYSTEM, WIRELESS POWER TRANSMITTER THEREOF, AND WIRELESS TRANSMITTING METHOD THEREFOR

(71) Applicant: NewEdge Technologies, Inc., Grand Cayman (KY)

(72) Inventors: Chen Liu, Shanghai (CN); Tim Hui-Hung Lu, Shanghai (CN); Jong-keung Cheng, Shanghai (CN)

(73) Assignee: NEWEDGE TECHNOLOGIES, INC., Grand Cayman (KY)

( * ) Notice: Subject to any disclaimer, the term of this patent is extended or adjusted under 35 U.S.C. 154(b) by 127 days.

(21) Appl. No.: 15/013,532

(22) Filed: Feb. 2, 2016

(65) Prior Publication Data

US 2017/0047763 A1   Feb. 16, 2017

(30) Foreign Application Priority Data

Aug. 11, 2015  (CN) .......................... 2015 1 0491059

(51) Int. Cl.
| | |
|---|---|
| H01M 10/46 | (2006.01) |
| H02J 7/02 | (2016.01) |
| H02J 7/04 | (2006.01) |
| H02J 50/10 | (2016.01) |

(52) U.S. Cl.
CPC .............. *H02J 7/025* (2013.01); *H02J 7/045* (2013.01); *H02J 50/10* (2016.02)

(58) Field of Classification Search
CPC .................................. H02J 7/025; H02J 5/005
USPC .................................. 320/107, 108; 307/104
See application file for complete search history.

(56) References Cited

U.S. PATENT DOCUMENTS

2016/0336785 A1* 11/2016 Gao ........................ H02J 50/80

* cited by examiner

*Primary Examiner* — Edward Tso
(74) *Attorney, Agent, or Firm* — Andrew M. Calderon; Roberts Mlotkowski Safran Cole & Caleron, P.C.

(57) ABSTRACT

A wireless charging system, a wireless power transmitter, and a wireless transmitting method are provided. The method includes generating a pulse width modulation signal having an operating frequency according to a parameter, transmitting a power signal according to the pulse width modulation signal, generating a sampling frequency according to the operating frequency, obtaining power adjusting information from a transmission coil according to the sampling frequency, and adjusting the parameter according to the power adjusting information. The sampling frequency is the product of the operating frequency and a multiple, and the multiple is the summation of an offset and a positive integer. The offset is in the range of 0.25 to 0.75.

13 Claims, 2 Drawing Sheets

WIRELESS CHARGING SYSTEM, WIRELESS POWER TRANSMITTER THEREOF, AND WIRELESS TRANSMITTING METHOD THEREFOR

CROSS-REFERENCES TO RELATED APPLICATIONS

This non-provisional application claims priority under 35 U.S.C. §119(a) on Patent Application No. 201510491059.X filed in China, P.R.C. on 2015 Aug. 11, the entire contents of which are hereby incorporated by reference.

BACKGROUND

Technical Field

The instant disclosure relates to a charging system, and particularly relates to a wireless charging system.

Related Art

Wireless charging technology is also called non-contact charging technology. In the technology, wires can be omitted, so that a user can be prevented from getting electric shock; furthermore, since wireless charging does not need wall sockets, problems of winded wires can be prevented. The wireless charging technology improves the safety and convenience in power charging and transmission, accordingly, products applied with wireless charging technologies are widely available on the market.

The wireless charging technologies utilize the electromagnetic induction principle for power transmission. In detail, a charger transmits power to an electronic device by coil coupling, wherein the charger comprises a wireless power transmitter, and the electronic device comprises a wireless power receiver. A primary coil of the wireless power transmitter is closely attached to a mating secondary coil of the wireless power receiver for power transmission. After the primary coil is electrified, the primary coil generates a magnetic field. Next, the secondary coil is affected by the magnetic field to generate an inductive current. And then, a rectifying circuit of the wireless power receiver converts the inductive current into a direct current. Hence, the electronic device receives the direct current for charging. Accordingly, the power is transmitted from the charger to the electronic device.

In addition, the wireless power receiver can generate power control signals (or called packets) according to the received power and transmit the power control signals to the wireless power transmitter for power control and program control. And then, the wireless power transmitter adjusts the power to be transmitted according to the power control signal. Accordingly, in the conventional, the wireless power receiver modulates the power control signals and then transmits the modulated power control signals. The wireless power transmitter demodulates the modulated power control signals to obtain the power control signals. However, the filter of the demodulation circuit in the conventional wireless power transmitter is complicated, so that the circuit cost is increased and the circuit design is rather difficult.

SUMMARY

In view of these, the instant disclosure provides a wireless charging system, a wireless power transmitter thereof, and a wireless transmitting method therefor.

In one embodiment, a wireless power transmitter comprises a power switch circuit, a transmission coil, a demodulation circuit, and a control circuit. The power switch circuit outputs a pulse width modulation signal having an operating frequency according to a parameter. The transmission coil transmits a power signal according to the pulse width modulation signal. The demodulation circuit obtains power adjusting information from the transmission coil according to a sampling frequency. The control circuit adjusts the parameter according to the power adjusting information. The sampling frequency is the product of the operating frequency and a multiple, the multiple is a summation of a positive integer and an offset, and the offset is in the range of 0.25 to 0.75.

In one embodiment, a wireless transmitting method comprises generating a pulse width modulation signal having an operating frequency according to a parameter, transmitting a power signal according to the pulse width modulation signal, generating a sampling frequency according to the operating frequency, obtaining power adjusting information from a transmission coil according to the sampling frequency, and adjusting the parameter according to the power adjusting information. Wherein, the sampling frequency is the product of the operating frequency and a multiple, the multiple is the summation of a positive integer and an offset, and the offset is in the range of 0.25 to 0.75.

In one embodiment, a wireless charging system comprises a wireless power transmitter and a wireless power receiver. The wireless power transmitter comprises a power switch circuit, a transmission coil, a demodulation circuit, and a control circuit. The power switch circuit outputs a pulse width modulation signal having an operating frequency according to a parameter. The transmission coil transmits a power signal according to the pulse width modulation signal. The demodulation circuit obtains power adjusting information from the transmission coil according to a sampling frequency. The control circuit adjusts the parameter according to the power adjusting information. The sampling frequency is the product of the operating frequency and a multiple, the multiple is the summation of a positive integer and an offset, and the offset is in the range of 0.25 to 0.75. The wireless power receiver comprises a secondary coil, a rectifier circuit, and a modulation circuit. The secondary coil receives the power signal from the transmission coil. The rectifier circuit rectifies the power signal to generate a direct current signal. The modulation circuit generates a modulation signal according to the direct current signal, and the modulation signal comprises the power adjusting information.

Based on the above, the wireless power transmitter according to one embodiment of the instant disclosure transmits the power signal having the operating frequency, and the demodulation circuit of the wireless power transmitter demodulates the packet from the wireless power receiver according to the sampling frequency. The sampling frequency is the product of the operating frequency and the multiple, and the multiple is the summation of a positive integer and an offset in the range of 0.25 to 0.75. Accordingly, the filter of the demodulation circuit can be implemented by a lower order filter. Therefore, the circuit cost can be reduced, and the circuit design is rather simple.

BRIEF DESCRIPTION OF THE DRAWINGS

The disclosure will become more fully understood from the detailed description given herein accompanying by the following figures, which are illustration only, and thus not limitative of the disclosure, wherein.

DETAILED DESCRIPTION

Figure 1:
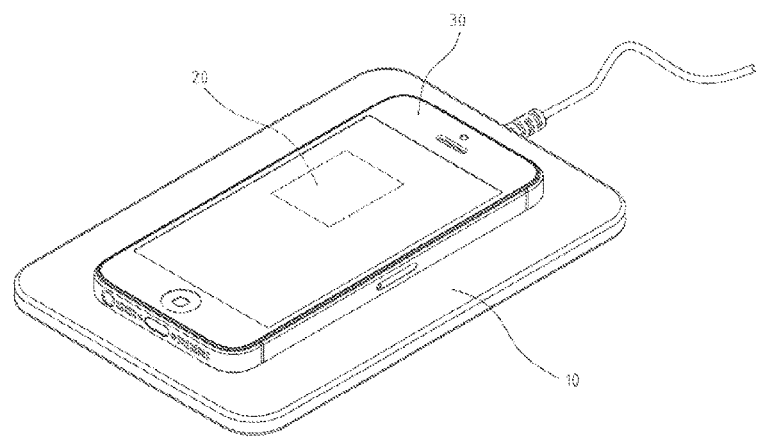
FIG. 1 illustrates a perspective view of a wireless charging system according to one embodiment of the instant disclosure.

FIG. 1 illustrates a perspective view of a wireless charging system according to one embodiment of the instant disclosure. Please refer to FIG. 1, the wireless charging system comprises a wireless power transmitter 10 and a wireless power receiver 20. The wireless power receiver 20 is in an electronic apparatus 30, and the wireless power transmitter 10 may transmit power to the wireless power receiver 20 to charge the electronic apparatus 30 wirelessly. In some embodiments, the electronic apparatus 30 may be, but not limited to, a mobile phone, a tablet, a laptop, or a multimedia player.

Figure 2:
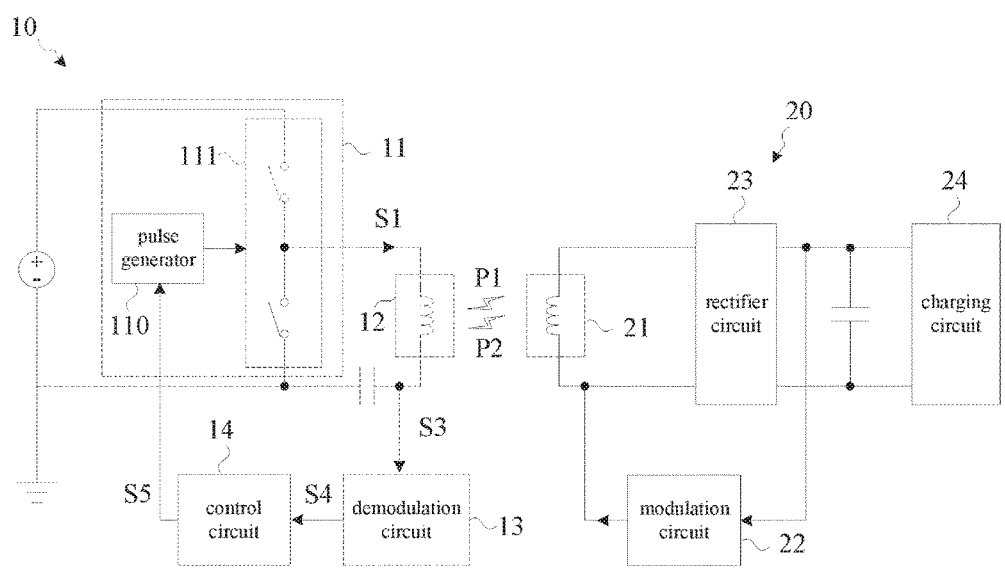
FIG. 2 illustrates a functional block diagram of a wireless power transmitter and a wireless power receiver of FIG. 1 according to one embodiment of the instant disclosure.

FIG. 2 illustrates a functional block diagram of a wireless power transmitter 10 and a wireless power receiver 20 of FIG. 1 according to one embodiment of the instant disclosure. Please refer to FIG. 2, the wireless power transmitter 10 comprises a power switch circuit 11, a transmission coil 12, a demodulation circuit 13, and a control circuit 14. The power switch circuit 11, the transmission coil 12, the demodulation circuit 13, and the control circuit 14 are serially connected with one another, and the control circuit 14 is coupled to the power switch circuit 11. The wireless power receiver 20 comprises a secondary coil 21, a modulation circuit 22, a rectifier circuit 23, and a charging circuit 24. The secondary coil 21 is coupled to the rectifier circuit 23, and the modulation circuit 22 is coupled between the rectifier circuit 23 and the charging circuit 24.

The power switch circuit 11 can output pulse width modulation (PWM) signal S1 according to a parameter S5, and the pulse width modulation signal S1 has an operating frequency. The transmission coil 12 transmits a power signal P1 to the wireless power receiver 20 according to the pulse width modulation signal S1, and the frequency of the power signal P1 is the same as the operating frequency. Taking the Qi standard published by Wireless Power Consortium (WPC) as an example, the operating frequency is in the range between 100 kHz to 205 kHz. In this embodiment, the wireless power receiver 20 receives the power signal P1 through the secondary coil 21. Next, the rectifier circuit 23 converts the power signal P1 into a direct current signal and transmits the direct current signal to the charge circuit 24. And then, the secondary coil 21 can send a packet P2 generated by the modulation circuit 22 to the wireless power transmitter 10, and the packet P2 comprises power adjusting information S4. The transmission coil 12 of the wireless power transmitter 10 can receive the packet P2, and the demodulation circuit 13 demodulates the packet P2 of a signal S3 from the transmission coil 12 to obtain the power adjusting information S4. The signal S3 may be a current signal or a voltage signal. The control circuit 14 generates the parameter S5 according to the power adjusting information S4 and adjusts the parameter S5. The power switch circuit 11 can generate the pulse width modulation signal S1 according to the parameter S5, so that the transmission coil 12 can transmit power signals P1 with different energies to the wireless power receiver 20. In some embodiments, the control circuit 14 comprises a decoder for decoding the power adjusting information S4 to generate the parameter S5.

The power switch circuit 11 may be implemented by a half-bridge inverter 111 and a pulse generator 110. Alternatively, in some embodiments, the power switch circuit 11 may be implemented by a full-bridge inverter (not shown). The parameter S5 generated by the control circuit 14 may be duty circle, frequency, or the combination of duty circle and frequency. The control circuit 14 controls the pulse signal generator 110 to generate pulse signals having different duty circles, different frequencies, or having different duty circles and different frequencies to drive the half-bridge inverter 111 to generate the pulse width modulation signal S1. In some embodiments, the control circuit 14 may be an element having computation abilities, such as a microprocessor, a central processing controller, or a microcontroller.

Specifically, the demodulation circuit 13 obtains the power adjusting information S4 from the transmission coil 12 according to a sampling frequency. Since the packet P2 sent by the wireless power receiver 20 belongs to analog signals and has the operating frequency, the signal S3 from the transmission coil 12 comprises the packet P2 and a harmonic signal corresponding to the operating frequency. In order to prevent the sampling frequency from being interfered by the harmonic signal, the sampling frequency is generated corresponding to the operating frequency. In other words, when operating frequency of the power signal P1 transmitted by the transmission coil 21 changes, the sampling frequency changes, too. The sampling frequency is proportional to the operating frequency; that is, the sampling frequency is the product of the operating frequency and a multiple, and the multiple is the summation of a positive integer and an offset in the range of 0.25 to 0.75. For example, if the positive integer is 8, then the multiple is in the range of 8.25 to 8.75. Taking the aforementioned Qi standard as an example, if the operating frequency is 175 kHz, then the sampling frequency may be any value in the range of 1443.75 kHz to 1531.25 kHz. The operation of the demodulation circuit 13 is further described in the following paragraphs.

Figure 3:
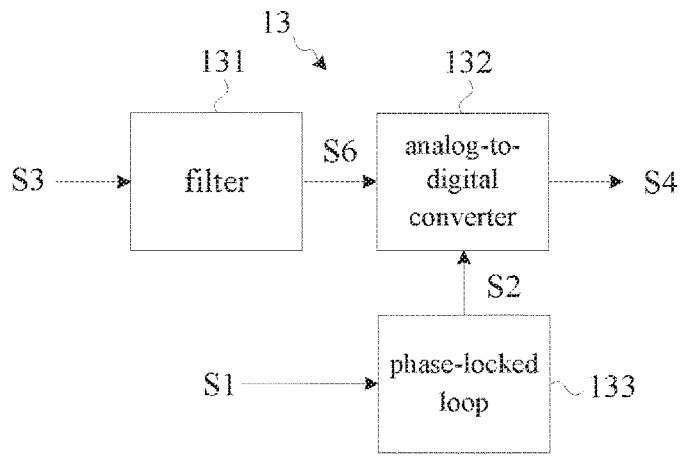
FIG. 3 illustrates a functional block diagram of a demodulation circuit of FIG. 2 according to one embodiment of the instant disclosure.

FIG. 3 illustrates a functional block diagram of a demodulation circuit 13 of FIG. 2 according to one embodiment of the instant disclosure. Please refer to FIG. 3, the demodulation circuit 13 comprises a filter 131, an analog-to-digital converter (ADC) 132, and a phase-locked loop (PLL) 133. The filter 131 and the analog-to-digital converter 132 are sequentially connected with one another, and an output end of the phase-locked loop 133 is coupled to a control end of the analog-to-digital converter 132.

An input end of the filter 131 is coupled to the transmission coil 12 to receive the signal S3 from the transmission coil 12. The filter 131 filters the signal S3 to remove harmonic signals at certain frequency bands and outputs a filtered signal S6. An input end of the analog-to-digital converter 132 receives the filtered signal S5 and the control end of the analog-to-digital converter 132 is coupled to the phase-locked loop 133. The analog-to-digital converter 132 can execute an analog-to-digital conversion to the filtered signal S6 with the sampling frequency. In other words, the analog-to-digital converter 132 samples the filtered signal S6 with the sampling frequency to convert the filtered signal S6 into a digital signal. The analog-to-digital converter 132 is known and herein its detail structure and its operation would not be described.

In practice, because of the circuit costs, a designer may take the trade-off between sampling performance and filtering performance. The sampling performances and the filtering performances are respectively related to the sampling frequency of the analog-to-digital converter 132 and the order of the filter 131. When the sampling frequency is lower, the analog-to-digital converter 132 may sample noises in addition to packet P2. Therefore, a higher order filter 131 is utilized in the embodiment, for example, a second order filter, a third order filter, or even a fourth or higher order filter, so that most of the noises can be filtered. Conversely, when the sampling frequency is higher, the analog-to-digital converter 132 would not obtain noises easily from the sampling. Therefore, a lower order filter 131 is enough to be utilized in the embodiment, for example, a first order filter. As mentioned above, the sampling frequency is the product of the operating frequency and the multiple (i.e., the summation of a positive integer and an offset). Considering the circuit cost, the positive integer may be less than or equal to 10; while further considering the filtering performance, the positive integer may be greater than or equal to 5. In this embodiment, the positive integer may be 5, 6, 7, 8, 9, or 10, and the multiple is in the range of 5.25 to 5.75, 6.25 to 6.75, 7.25 to 7.75, 8.25 to 8.75, 9.25 to 9.75, or 10.25 to 10.75. In order to prevent an aliasing between the operating frequency and the harmonic signal and in order to have a lower circuit cost, the multiple may be 8.5, and the filter 131 may be implemented by a first order filter.

As shown in FIGS. 2 and 3, an input end of the phase-locked loop 133 is coupled to the output end of the power switch circuit 11. The phase-locked loop 133 receives the pulse width modulation signal S1 and generates a sampling signal S2 having the sampling frequency according to the pulse width modulation signal S1. The phase-locked loop 133 takes the pulse width modulation signal S1 as a reference signal and outputs the sampling signal S2 according to the multiple, so that the sampling signal S2 has the sampling frequency. The phase-locked loop 133 is known and herein its detail structure and its operation would not be described. In practice, a designer may design the phase-locked loop 133 according to the multiple. After the phase-locked loop 133 receives the pulse width modulation signal S1, the phase-locked loop 133 generates the sampling signal S2 having the sampling frequency. Alternatively, the phase-locked loop 133 may have another input end to receive the multiple, so that the phase-locked loop 133 can generate the sampling signal S2 according to the pulse width modulation signal S1 and the multiple from an external circuit. Accordingly, for one embodiment in which the multiple is 8.5 and the operating frequency is 175 kHz, after the phase-locked loop 133 receives the pulse width modulation signal S1, the phase-locked loop 133 outputs a sampling signal S2 with frequency of 1487.5 kHz. And, the analog-to-digital converter 132 can samples the filtered signal S6 with a sampling frequency of 1487.5 kHz to execute an analog-to-digital conversion.

In some embodiments, the phase-locked loop 133 may be replaced by a frequency synthesizer or circuits capable of boosting the reference frequency, so that a sampling frequency proportional to the operating frequency by the multiple can be generated according to the operating frequency.

In some embodiments, the demodulation circuit 13 may further comprise a frequency mixer and a digital filter (not shown), so that the demodulation circuit 13 executes a digital filtering to the power adjusting information S4 repeatedly.

Figure 4:
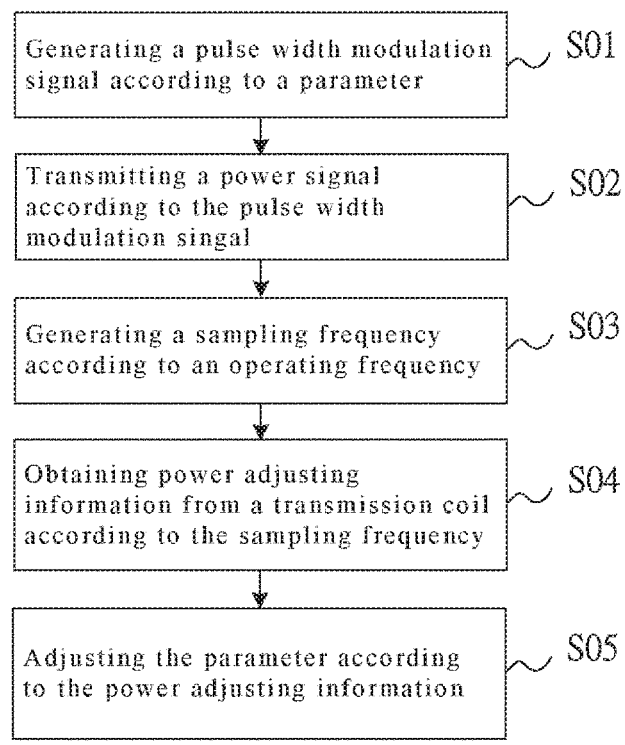
FIG. 4 illustrates a flowchart of a wireless transmitting method according to one embodiment of the instant disclosure.

FIG. 4 illustrates a flowchart of a wireless transmitting method according to one embodiment of the instant disclosure. Please refer to FIGS. 2 to 4. Firstly, the power switch circuit 11 generates the pulse width modulation signal S1 having the operating frequency according to the parameter S5 (step S01). Next, the transmission coil 12 transmits the power signal P1 to the wireless power receiver 20 according to the pulse width modulation signal S1 (step S02). And then, the demodulation circuit 13 generates the sampling signal S2 having the sampling frequency according to the operating frequency (step S03). The sampling frequency is the product of the operating frequency and the multiple. Hence, the demodulation circuit 13 obtains the power adjusting information S4 from the transmission coil 12 according to the sampling frequency (step S04). And then, the control circuit 14 adjusts the parameter S5 according to the power adjusting information S4 (step S05). Therefore, the transmission coil 12 can transmit power signals P1 with different energies to the wireless power receiver 20. In addition, the multiple is the summation of a positive integer and an offset, and the offset is in the range of 0.25 to 0.75.

In the step S03, the demodulation circuit 13 generates the sampling frequency through the phase-locked loop 133. After the transmission coil 12 transmits the power signal P1 (i.e., after step S02), the wireless power receiver 20 sends the packet P2 having the power adjusting information S4 to the wireless power transmitter 10. Accordingly, in the step S04, the demodulation circuit 13 firstly filters the signal S3 from the transmission coil 12 to generate the filtered signal S6. Then, through the analog-to-digital converter 132, the demodulation circuit 13 executes the analog-to-digital conversion to the filtered signal S6 with the sampling frequency, so that the power adjusting information S4 can be obtained.

In the step S03, the positive integer may be 5, 6, 7, 8, 9, or 10, and the multiple may be in the range of 5.25 to 5.75, 6.25 to 6.75, 7.25 to 7.75, 8.25 to 8.75, 9.25 to 9.75, or 10.25 to 10.75. In one embodiment, when the analog-to-digital converter 132 samples the filtered signal S6 by a frequency of 8.5 times of the operating frequency, i.e., when the multiple is substantially in the range of 8.25 to 8.75, a first level aliasing filter 131 can be applied to filter the packet P2. Accordingly, the circuit cost can be reduced.

Based on the above, the wireless power transmitter according to one embodiment of the instant disclosure transmits the power signal having the operating frequency, and the demodulation circuit of the wireless power transmitter demodulates the packet from the wireless power receiver according to the sampling frequency. The sampling frequency is the product of the operating frequency and the multiple, and the multiple is the summation of a positive integer and an offset in the range of 0.25 to 0.75. Accordingly, the filter of the demodulation circuit can be implemented by a lower order filter. Therefore, the circuit cost can be reduced, and the circuit design is rather simple.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A wireless power transmitter adapted to charge an electronic apparatus, wherein the wireless power transmitter comprises:
   a power switch circuit for outputting a pulse width modulation signal according to a parameter, wherein the pulse width modulation signal has an operating frequency;
   a transmission coil for transmitting a power signal according to the pulse width modulation signal;
   a demodulation circuit for obtaining power adjusting information from the transmission coil according to a sampling frequency, wherein the sampling frequency is the product of the operating frequency and a multiple, the multiple is the summation of a positive integer and an offset, and the offset is in the range of 0.25 to 0.75; and
   a control circuit for adjusting the parameter according to the power adjusting information.

2. The wireless power transmitter according to claim 1, wherein the demodulation circuit comprises a phase-locked loop for generating the sampling frequency according to the multiple and the pulse width modulation signal.

3. The wireless power transmitter according to claim 2, wherein the demodulation circuit further comprises a filter and an analog-to-digital converter, the filter filters a signal received by the transmitting coil to generate a filtered signal, and the analog-to-digital converter samples the filtered signal with the sampling frequency to obtain the power adjusting information.

4. The wireless power transmitter according to claim 3, wherein the multiple is in the range of 8.25 to 8.75, and the filter is a first order filter.

5. The wireless power transmitter according to claim 1, wherein the demodulation circuit further comprises a filter and an analog-to-digital converter, the filter filters a signal received by the transmitting coil to generate a filtered signal, and the analog-to-digital converter samples the filtered signal with the sampling frequency to obtain the power adjusting information.

6. The wireless power transmitter according to claim 5, wherein the multiple is in the range of 8.25 to 8.75, and the filter is a first order filter.

7. The wireless power transmitter according to claim 1, wherein the positive integer is 5, 6, 7, 8, 9, or 10, the multiple is in the range of 5.25 to 5.75, 6.25 to 6.75, 7.25 to 7.75, 8.25 to 8.75, 9.25 to 9.75, or 10.25 to 10.75.

8. A wireless charging system, comprising:
   a wireless power transmitter comprising:
      a power switch circuit for outputting a pulse width modulation signal according to a parameter, wherein the pulse width modulation signal has an operating frequency;
      a transmitting coil for transmitting a power signal according to the pulse width modulation signal;
      a demodulation circuit for obtaining power adjusting information from the transmitting coil according to a sampling frequency, wherein the sampling frequency is the product of the operating frequency and a multiple, the multiple is the summation of a positive integer and an offset, and the offset is in the range of 0.25 to 0.75; and
      a control circuit for adjusting the parameter according to the power adjusting information; and
   a wireless power receiver comprising:
      a secondary coil for receiving the power signal;
      a rectifier circuit for rectifying the power signal to generate a direct current signal; and
      a modulation circuit for generating a modulation signal according to the direct current signal, wherein the modulation signal comprises the power adjusting information.

9. The wireless charging system according to claim 8, wherein the demodulation circuit comprises a phase-locked loop for generating the sampling frequency according to the multiple and the pulse width modulation signal.

10. The wireless charging system according to claim 9, wherein the demodulation circuit further comprises a filter and an analog-to-digital converter, the filter filters a signal received by the transmitting coil to generate a filtered signal, the analog-to-digital converter samples the filtered signal with the sampling frequency to obtain the power adjusting information.

11. The wireless charging system according to claim 10, wherein the multiple is in the range of 8.25 to 8.75, and the filter is a first order filter.

12. The wireless charging system according to claim 8, wherein the demodulation circuit further comprises a filter and an analog-to-digital converter, the filter filters a signal received by the transmitting coil to generate a filtered signal, the analog-to-digital converter samples the filtered signal with the sampling frequency to obtain the power adjusting information, wherein the multiple is in the range of 8.25 to 8.75, and the filter is a first order filter.

13. The wireless charging system according to claim 8, wherein the positive integer is 5, 6, 7, 8, 9, or 10, the multiple is in the range of 5.25 to 5.75, 6.25 to 6.75, 7.25 to 7.75, 8.25 to 8.75, 9.25 to 9.75, or 10.25 to 10.75.

* * * * *